United States Patent
Sun et al.

(10) Patent No.: US 11,026,228 B2
(45) Date of Patent: Jun. 1, 2021

(54) SLOT TYPE INDICATION METHOD AND APPARATUS, AND SLOT TYPE DETERMINING METHOD AND APPARATUS

(71) Applicant: HUAWEI TECHNOLOGIES CO., LTD, Shenzhen (CN)

(72) Inventors: Hao Sun, Beijing (CN); Bingyu Qu, Beijing (CN); Lixia Xue, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/504,233

(22) Filed: Jul. 6, 2019

(65) Prior Publication Data

US 2019/0335458 A1 Oct. 31, 2019

Related U.S. Application Data

(63) Continuation of application No. PCT/CN2017/119053, filed on Dec. 27, 2017.

(30) Foreign Application Priority Data

Jan. 6, 2017 (CN) .......................... 201710011444.9

(51) Int. Cl.
*H04W 72/04* (2009.01)
*H04B 7/26* (2006.01)
*H04L 5/00* (2006.01)

(52) U.S. Cl.
CPC ...... *H04W 72/0446* (2013.01); *H04B 7/2656* (2013.01); *H04L 5/0053* (2013.01); *H04W 72/042* (2013.01); *H04W 72/0453* (2013.01)

(58) Field of Classification Search
CPC .... H04B 7/2656; H04L 5/0053; H04W 72/04; H04W 72/042; H04W 72/0446; H04W 72/0453
See application file for complete search history.

(56) References Cited

U.S. PATENT DOCUMENTS 10,211,955 B2 *  2/2019  Chen ................. H04L 5/0091
10,470,205 B2 * 11/2019  Parkvall ............. H04W 72/042
(Continued)

FOREIGN PATENT DOCUMENTS

CN    101237611 A    8/2008
CN    102263720 A    11/2011
(Continued)

OTHER PUBLICATIONS

ZTE, About Slot structure and Scheduling Units for NR, Oct. 10, 2016, 3GPP TSG RAN WG1 Meeting #86bis, Tdoc: R1-1608964 (Year: 2016).*
(Continued)

*Primary Examiner* — Eric Nowlin
(74) *Attorney, Agent, or Firm* — Kilpatrick Townsend & Stockton LLP

(57) ABSTRACT

A slot type indication method and an apparatus and a slot type determining method and an apparatus are provided. Under the slot type indication method, a first indication information can be generated by a network device. The first indication information indicates a slot type of a first slot. When the slot type of the first slot is a predefined type, the first indication information further indicates whether a second slot is an uplink-only slot, and the first slot is a slot that includes a downlink control channel. The first indication information can be sent, by the network device, by using the downlink control channel of the first slot.

18 Claims, 4 Drawing Sheets

Uplink-dominant slot     Downlink-dominant slot

Uplink-only slot     Downlink-only slot

(56) References Cited

U.S. PATENT DOCUMENTS

| | | | | |
|---|---|---|---|---|
| 10,506,586 | B2* | 12/2019 | Lee | H04W 72/12 |
| 10,548,126 | B2* | 1/2020 | Chen | H04W 24/10 |
| 10,595,314 | B2* | 3/2020 | Sun | H04W 76/27 |
| 2016/0119820 | A1 | 4/2016 | Lin et al. | |
| 2016/0192355 | A1 | 6/2016 | Yu et al. | |
| 2016/0234001 | A1 | 8/2016 | Farley et al. | |
| 2017/0041122 | A1 | 2/2017 | Li et al. | |
| 2018/0219654 | A1* | 8/2018 | Chen | H04L 5/0007 |
| 2018/0279304 | A1* | 9/2018 | Lee | H04L 5/0094 |
| 2018/0302905 | A1* | 10/2018 | Fodor | H04L 27/2646 |
| 2018/0309513 | A1* | 10/2018 | Kim | H04L 5/0094 |
| 2018/0368114 | A1* | 12/2018 | Chen | H04L 5/0053 |
| 2019/0037561 | A1* | 1/2019 | Jung | H04L 1/1854 |
| 2019/0053227 | A1* | 2/2019 | Huang | H04L 5/0098 |
| 2019/0082427 | A1* | 3/2019 | Kim | H04W 72/042 |
| 2019/0082448 | A1* | 3/2019 | Nogami | H04W 72/1263 |
| 2019/0089584 | A1* | 3/2019 | Islam | H04W 72/0446 |
| 2019/0132092 | A1* | 5/2019 | Chen | H04W 72/1205 |
| 2019/0200351 | A1* | 6/2019 | Sun | H04L 5/0096 |
| 2019/0200355 | A1* | 6/2019 | Baldemair | H04L 5/0053 |
| 2019/0215112 | A1* | 7/2019 | Chen | H04L 5/16 |
| 2019/0215831 | A1* | 7/2019 | Baldemair | H04L 27/2607 |
| 2019/0222380 | A1* | 7/2019 | Manolakos | H04L 1/08 |
| 2019/0230687 | A1* | 7/2019 | Parkvall | H04W 72/042 |
| 2020/0077393 | A1* | 3/2020 | Lee | H04L 5/0094 |
| 2020/0137747 | A1* | 4/2020 | Xu | H04W 88/06 |
| 2020/0137753 | A1* | 4/2020 | Sun | H04B 7/2656 |
| 2020/0169377 | A1* | 5/2020 | Lee | H04W 56/0015 |
| 2020/0214008 | A1* | 7/2020 | Jo | H04W 72/0446 |
| 2020/0228382 | A1* | 7/2020 | Lin | H04W 36/0077 |
| 2020/0344728 | A1* | 10/2020 | Gao | H04W 72/0413 |

FOREIGN PATENT DOCUMENTS

| | | | | |
|---|---|---|---|---|
| CN | 103916957 | A | | 7/2014 |
| CN | 104348602 | A | | 2/2015 |
| CN | 105099631 | A | | 11/2015 |
| EP | 3580979 | A4 * | 2/2020 | H04W 72/0413 |
| WO | 2016045744 | A1 | | 3/2016 |
| WO | WO-2018126401 | A1 * | 7/2018 | H04L 5/0044 |
| WO | WO-2018166324 | A1 * | 9/2018 | H04W 80/08 |
| WO | WO-2018231678 | A1 * | 12/2018 | H04L 5/0053 |
| WO | WQ-2019051096 | A1 * | 3/2019 | H04W 72/1289 |
| WO | WO-2019125780 | A1 * | 6/2019 | H04L 5/0094 |

OTHER PUBLICATIONS

Nokia et al., On the subframe and slot structures in NR, Oct. 10, 2016, 3GPP TSG RAN WG1 Meeting #86bis, Tdoc: R1-1609662 (Year: 2016).*

Panasonic, Timing relation dependency to slots transmission direction indication method, Oct. 10, 2016, 3GPP TSG RAN WG1 Meeting #86bis, Tdoc: R1-1609706 (Year: 2016).*

Qualcomm Incorporated, Summary of [86-19] Discussion on Slot Structure Use Cases, , Oct. 10, 2016, 3GPP TSG RAN WG1 Meeting #86bis, Tdoc: R1-1610128 (Year: 2016).*

Qualcomm Incorporated, Summary of [86-19] Discussion on Slot Structure Use Cases, , Oct. 10, 2016, 3GPP TSG RAN WG1 Meeting #86bis, Tdoc: R1-1610129 (Year: 2016).*

Huawei et al., Scheduling scheme for slot aggregation, Nov. 14, 2016, 3GPP TSG RAN WG1 Meeting #87, Tdoc: R1-1611662 (Year: 2016).*

Nokia et al., On the number of symbols in a slot and minimum transmission duration, Nov. 14, 2016, 3GPP TSG RAN WG1 Meeting #87, Tdoc: R1-1612261 (Year: 2016).*

Samsung, Slot Aggregation, Nov. 14, 2016, 3GPP TSG RAN WG1 Meeting #87, Tdoc: R1-1612438 (Year: 2016).*

MediaTek Inc., "Discussion on slot structure and channel format",3GPP TSG RAN WG1 Meeting #86bis R1-1609555,Lisbon, Portugal, Oct. 10-14, 2016,total 6 pages.

MediaTek Inc., "DL Control Channel Design for NR",3GPP TSG RAN WG1 Meeting #87 R1-1612120,Reno, USA, Nov. 14-18, 2016,total 4 pages.

MediaTek Inc., "Multiplexing of PUCCH and other channels",3GPP TSG RAN Wcl Meeting #87 R1-1612140,Reno, USA Nov. 14-18, 2016,total 6 pages.

* cited by examiner

SLOT TYPE INDICATION METHOD AND APPARATUS, AND SLOT TYPE DETERMINING METHOD AND APPARATUS

CROSS-REFERENCE TO RELATED APPLICATIONS

This application is a continuation of International Application No. PCT/CN2017/119053, filed on Dec. 27, 2017, which claims priority to Chinese Patent Application No. 201710011444.9, filed on Jan. 6, 2017. The disclosures of the aforementioned applications are hereby incorporated by reference in their entireties.

TECHNICAL FIELD

This application relates to the field of communications technologies, and in particular, to a slot type indication method and an apparatus and a slot type determining method and an apparatus.

BACKGROUND

In a future 5th generation mobile communications system (The 5th Generation, 5G), there are four possible slot (slot) types: an uplink-dominant (Uplink-dominant, UL-dominant) slot, an uplink-only (UL-only) slot, a downlink-dominant (DL-dominant) slot, and a downlink-only (DL-only) slot. The UL-dominant slot, the DL-dominant slot, and the DL-only slot each include a downlink control channel, and only the UL-only slot does not include the downlink control channel.

A dynamic time division duplex (Time Division Duplexing, TDD) mechanism is introduced in the 5G system. In this mechanism, an uplink-downlink subframe configuration of the system dynamically changes at a granularity of a slot. A base station needs to dynamically notify a terminal of a slot type on each slot. In an existing solution, for a slot, if a slot type is a slot type other than a UL-only type, the base station may notify the terminal of the slot type by using a downlink control channel included in the slot. However, for a slot of the UL-only type, because the slot does not include the downlink control channel, the base station cannot notify a current slot type in the slot of the UL-only type. Therefore, how the base station notifies the terminal of a slot type of the UL-only slot is a current and urgent problem that needs to be resolved.

SUMMARY

Embodiments of this application provide a slot type indication method and an apparatus and a slot type determining method and an apparatus, to indicate, to a terminal, whether a slot is an uplink-only slot, thereby improving flexibility of a dynamic TDD mechanism.

According to a first aspect, a slot type indication method is provided, including:

generating, by a network device, first indication information, where the first indication information indicates a slot type of a first slot, when the slot type of the first slot is a predefined type, the first indication information is further used to indicate whether a second slot is an uplink-only slot, and the first slot is a slot that includes a downlink control channel; and sending, by the network device, the first indication information by using the downlink control channel of the first slot.

According to the method provided in this embodiment of this application, when the slot type of the first slot is the predefined type, the first indication information sent by the network device indicates the slot type of the first slot, and further indicates whether the second slot is the uplink-only slot, to indicate whether the second slot is the uplink-only slot, thereby improving flexibility of a dynamic TDD mechanism.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a second aspect, a slot type indication apparatus is provided, including:

a processing unit, configured to generate first indication information, where the first indication information indicates a slot type of a first slot, when the slot type of the first slot is a predefined type, the first indication information is further used to indicate whether a second slot is an uplink-only slot, and the first slot is a slot that includes a downlink control channel; and a transceiver unit, configured to send the first indication information by using the downlink control channel of the first slot.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a third aspect, a slot type indication apparatus is provided, including:

a processor, configured to generate first indication information, where the first indication information indicates a slot type of a first slot, when the slot type of the first slot is a predefined type, the first indication information is further used to indicate whether a second slot is an uplink-only slot, and the first slot is a slot that includes a downlink control channel; and a transceiver, configured to send the first indication information by using the downlink control channel of the first slot.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a fourth aspect, a slot type determining method is provided, including:

receiving, by a terminal device, first indication information by using a downlink control channel of a first slot, where the first slot is a slot that includes the downlink control channel; and determining, by the terminal device, a slot type of the first slot based on the first indication information, where when the slot type of the first slot is a predefined type, the first indication information is further used to indicate whether a second slot is an uplink-only slot.

According to the method provided in this embodiment of this application, when the slot type of the first slot is the predefined type, the first indication information received by the terminal device indicates the slot type of the first slot, and further indicates whether the second slot is the uplink-only slot, so that the terminal device can determine, based on the first indication information, whether the second slot is the uplink-only slot, thereby improving flexibility of a dynamic TDD mechanism.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a fifth aspect, a slot type determining apparatus is provided, including:

a transceiver unit, configured to receive first indication information by using a downlink control channel of a first slot, where the first slot is a slot that includes the downlink control channel; and a processing unit, configured to determine a slot type of the first slot based on the first indication information, where when the slot type of the first slot is a predefined type, the first indication information is further used to indicate whether a second slot is an uplink-only slot.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a sixth aspect, a slot type determining apparatus is provided, including:

a transceiver, configured to receive first indication information by using a downlink control channel of a first slot, where the first slot is a slot that includes the downlink control channel; and a processor, configured to determine a slot type of the first slot based on the first indication information, where when the slot type of the first slot is a predefined type, the first indication information is further used to indicate whether a second slot is an uplink-only slot.

Optionally, the second slot is a first slot whose type is dynamically configured after the first slot.

Optionally, the predefined type is an uplink-dominant slot or a downlink-dominant slot.

Optionally, the predefined type is semi-statically configured by using higher layer signaling.

Optionally, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

Optionally, the first group of preset values and the second group of preset values multiplex a bit in the first indication information.

Optionally, a time-frequency resource that is on the downlink control channel and that is used to send the first indication information is predefined or semi-statically configured.

Optionally, a spacing between subcarriers that are on the downlink control channel and that are used to send the first indication information is predefined or semi-statically configured.

According to a seventh aspect, a computer readable storage medium is provided, where the computer readable storage medium stores an instruction, and when the instruction runs on a computer, the computer performs the methods in the foregoing aspects.

According to an eighth aspect, a computer program product that includes an instruction is provided, where when the computer program product runs on a computer, the computer performs the methods in the foregoing aspects.

DESCRIPTION OF EMBODIMENTS

Various embodiments are applicable to a 4G (4th generation mobile communications system) evolved system, for example, an LTE (Long Term Evolution, long term evolution) system or a 5G (5th generation mobile communications system) system, for example, a communications system such as an access network that uses a new radio access technology (new radio access technology, New RAT), and a CRAN (Cloud Radio Access Network, cloud radio access network).

In the following, some terms in this application are described to help a person skilled in the art have a better understanding.

(1). A terminal device is also referred to as user equipment (User Equipment, UE), and is a device that provides a user with voice and/or data connectivity, for example, a handheld device or an in-vehicle device that has a wireless connection function. Common terminals include, for example, a mobile phone, a tablet computer, a notebook computer, a palmtop computer, a mobile Internet device (mobile internet device, MID), and a wearable device such as a smartwatch, a smart band, or a pedometer.

(2). A network device may be a radio access network (Radio Access Network, RAN) device, and is a device that connects a terminal to a wireless network, including but is not limited to a gNB (gNodeB), an evolved NodeB (evolved Node B, eNB), a radio network controller (radio network controller, RNC), a NodeB (Node B, NB), a base station controller (Base Station Controller, BSC), a base transceiver station (Base Transceiver Station, BTS), a home NodeB (for example, Home evolved NodeB or Home Node B, HNB), and a baseband unit (BaseBand Unit, BBU). In addition, the device may include a Wi-Fi access point (Access Point, AP) or the like.

(3). "A plurality of" indicates two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, it should be understood that although the terms "first", "second", "third", and the like may be used in the embodiments of this application to describe various messages, requests, and terminals, these messages, requests, and terminals are not limited to these terms. These terms are only used to differentiate between the messages, requests, and terminals.

(4). A symbol includes but is not limited to an orthogonal frequency division multiplexing (Orthogonal Frequency Division Multiplexing, OFDM) symbol, a sparse code multiple access (Sparse Code Multiplexing Access, SCMA) symbol, a filtered orthogonal frequency division multiplexing (Filtered Orthogonal Frequency Division Multiplexing, F-OFDM) symbol, and a non-orthogonal multiple access (Non-Orthogonal Multiple Access, NOMA) symbol. The symbol may be specifically determined based on an actual situation. Details are not described herein.

(5). In terms of a subframe, one subframe occupies a time-frequency resource of entire system bandwidth in frequency domain, and is a time-frequency resource element of fixed duration in time domain. The subframe may include K symbols. A value of K may be determined based on an actual situation, and is not limited herein. For example, in LTE, one subframe occupies 14 consecutive symbols in time domain; or in a 5G system, when a subcarrier width is 30 kHz/60 kHz, one subframe occupies 28/56 consecutive symbols in time domain.

(6). In terms of a slot (slot), the slot is a basic time-frequency resource element that occupies several consecutive symbols in time domain. A quantity of symbols included in the slot is less than a quantity of symbols included in a subframe.

Figure 1:
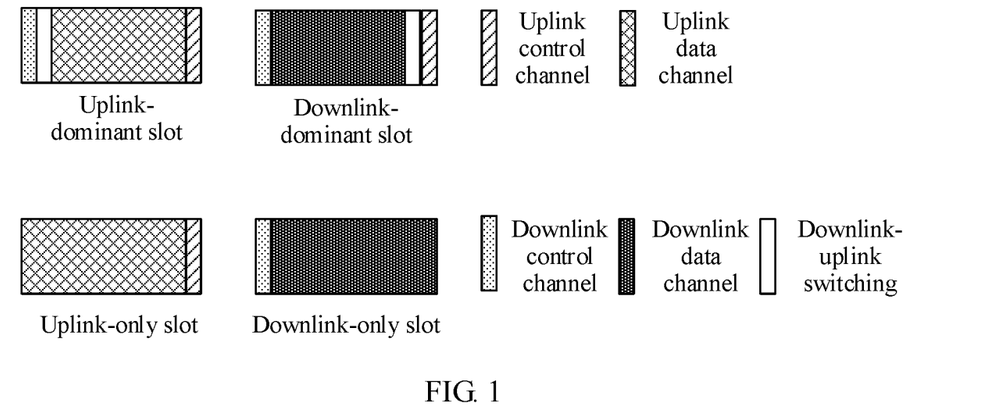
FIG. 1 is a schematic structural diagram of a slot according to an embodiment of this application.

Currently, in the 5G being discussed, a UL-dominant slot includes a downlink control channel, downlink-uplink switching, an uplink data channel, and an uplink control channel; a DL-dominant slot includes a downlink control channel, a downlink data channel, downlink-uplink switching, and an uplink control channel; a UL-only slot includes an uplink data channel and an uplink control channel; and a DL-only slot includes a downlink control channel and a downlink data channel. For details, refer to FIG. 1. In the embodiments of this application, the uplink control channel may be used to transmit information such as uplink control information or a sounding reference signal (Sounding Reference Signal, SRS) with short duration (short duration).

Figure 2:
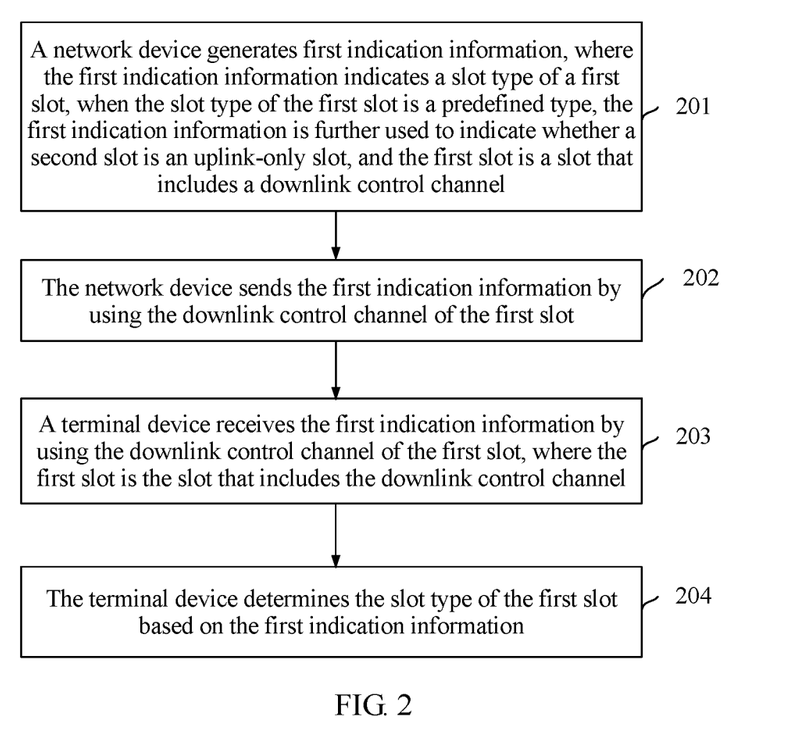
FIG. 2 is a schematic flowchart of a slot type indication method according to an embodiment of this application.

With reference to the foregoing description, FIG. 2 is a schematic flowchart of a slot type indication method according to one embodiment.

Step 201: A network device generates first indication information, where the first indication information indicates a slot type of a first slot, when the slot type of the first slot is a predefined type, the first indication information is further used to indicate whether a second slot is an uplink-only slot, and the first slot is a slot that includes a downlink control channel.

Step 202: The network device sends the first indication information by using the downlink control channel of the first slot.

Step 203: A terminal device receives the first indication information by using the downlink control channel of the first slot, where the first slot is the slot that includes the downlink control channel.

Step 204: The terminal device determines the slot type of the first slot based on the first indication information.

In step 201, the slot type of the first slot may be any one of a UL-dominant slot, a DL-dominant slot, and a DL-only slot. This is specifically determined based on an actual situation.

In this embodiment, the predefined type may be an uplink-dominant slot or a downlink-dominant slot.

In some embodiments, the network device and the terminal device may agree on the predefined type in advance, or the network device may semi-statically configure the predefined type by using higher layer signaling, and the terminal device may determine the predefined type by using the received higher layer signaling.

The higher layer signaling may be a master information block (Master Information Block, MIB), a system information block (System Information Block, SIB), radio resource control (Radio Resource Control, RRC) signaling, or other higher layer signaling that has a similar characteristic.

In this embodiment, the second slot may be a first slot whose type is dynamically configured after the first slot. In other words, the second slot may be a slot that is located after and adjacent to the first slot, or the second slot is a slot that is located after but not adjacent to the first slot.

It should be noted that the "dynamic configuration" described herein means that the network device can dynamically configure the slot type based on an actual situation. In other words, the network device can configure the slot by using duration of one slot as a granularity.

It should be noted that the uplink-only slot may be a slot that includes only an uplink channel, for example, the UL-only slot.

In this embodiment, the first indication information may be a first group of preset values or a second group of preset values. The first group of preset values includes a first preset value and a second preset value.

When the first indication information is the first group of preset values, the first indication information indicates that the slot type of the first slot is the predefined type. Further, when the first indication information is the first preset value in the first group of preset values, the first indication information indicates that the second slot is the uplink-only slot; or when the first indication information is the second preset value in the first group of preset values, the first indication information indicates that the second slot is not the uplink-only slot.

When the first indication information is the second group of preset values, the first indication information indicates the slot type of the first slot.

Further, the second group of preset values may include a third preset value and a fourth preset value. When the first indication information is the third preset value in the second group of preset values, the first indication information indicates that the first slot is a downlink-only slot; or when the first indication information is the fourth preset value in the second group of preset values, the first indication information indicates that the first slot is the downlink-dominant slot.

In some embodiments, the first group of preset values and the second group of preset values may multiplex a bit in the first indication information.

For example, the first indication information includes two bits. If the predefined type is the uplink-dominant slot, the first group of preset values includes 10 and 11, and the second group of preset values includes 00 and 01, content indicated by the first indication information may be shown in Table 1.

TABLE 1

| First indication information | Slot type of a first slot, and slot type of a second slot |
|---|---|
| 00 | Downlink-only slot |
| 01 | Downlink-dominant slot |
| 10 | Uplink-dominant slot, not uplink-only slot |
| 11 | Uplink-dominant slot, uplink-only slot |

With reference to Table 1, when the first indication information is 00, the first indication information indicates that the slot type of the first slot is the downlink-only slot; or when the first indication information is 01, the first indication information indicates that the slot type of the first slot is the downlink-dominant slot. When the first indication information is 10, the first indication information indicates that the slot type of the first slot is the predefined type (namely, the uplink-dominant slot) and the slot type of the second slot is not the uplink-only slot. When the first indication information is 11, the first indication information indicates that the slot type of the first slot is the predefined type and the slot type of the second slot is the uplink-only slot.

Certainly, the foregoing is merely an example, the first indication information may alternatively be in another form, and details are not described herein.

In step 202, the network device may send, by using the downlink control channel of the first slot, broadcast signaling that includes the first indication information, to send the first indication information.

After the terminal receives the first indication information in step 203, in step 204, the terminal device may determine the slot type of the first slot and the slot type of the second slot or determine the slot type of the first slot, based on the first indication information.

When determining, based on the first indication information, that the slot type of the second slot is not the uplink-only slot, the terminal device may further need to listen to broadcast signaling on the second slot, to determine the type of the second slot. When determining, based on the first indication information, that the slot type of the second slot is the uplink-only slot, the terminal device may not need to listen to broadcast signaling on the second slot.

It should be noted that, in this embodiment, a time-frequency resource that is on the downlink control channel and that is used to send the first indication information may be predefined or semi-statically configured. A spacing between subcarriers that are on the downlink control channel and that are used to send the first indication information may also be predefined or semi-statically configured. A specific method for performing pre-definition or semi-static configuration may be implemented based on an actual situation. Details are not described herein.

Figure 3:
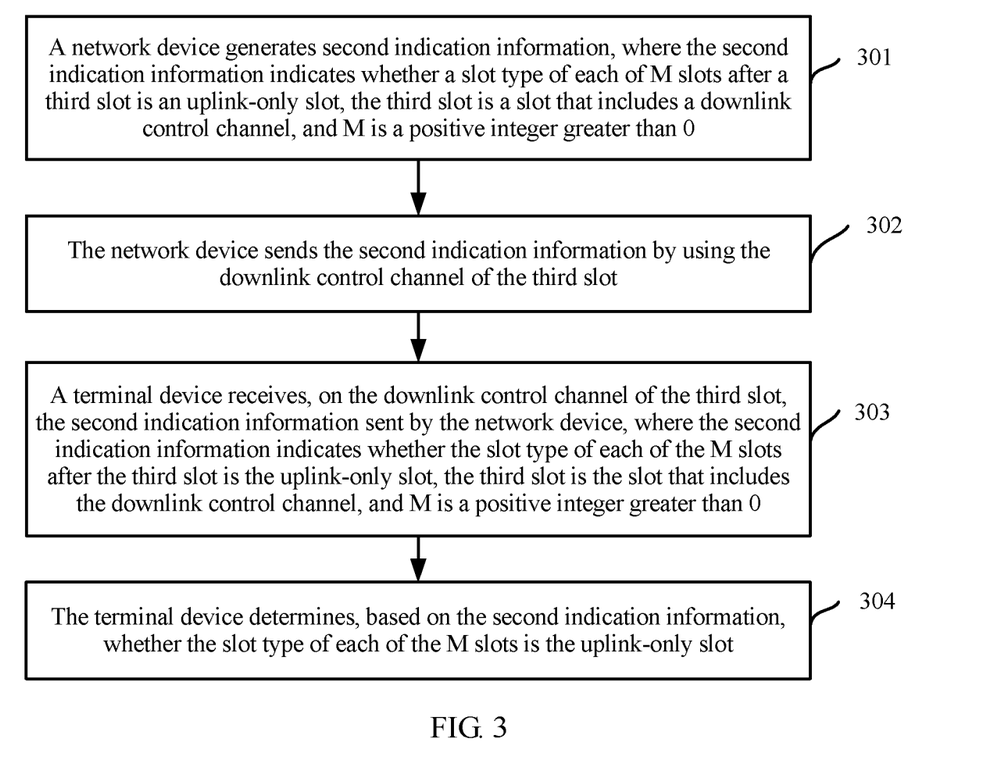
FIG. 3 is a schematic flowchart of a slot type indication method according to an embodiment of this application.

With reference to the foregoing description, FIG. 3 is a schematic flowchart of a slot type indication method according to an embodiment of this application.

Referring to FIG. 3, the method includes the following steps.

Step 301: A network device generates second indication information, where the second indication information indicates whether a slot type of each of M slots after a third slot is an uplink-only slot, the third slot is a slot that includes a downlink control channel, and M is a positive integer greater than 0.

The uplink-only slot may be a slot that includes only an uplink channel, for example, a UL-only slot.

Step 302: The network device sends the second indication information by using the downlink control channel of the third slot.

Step 303: A terminal device receives, on the downlink control channel of the third slot, the second indication information sent by the network device, where the second indication information indicates whether the slot type of each of the M slots after the third slot is the uplink-only slot, the third slot is the slot that includes the downlink control channel, and M is a positive integer greater than 0.

Step 304: The terminal device determines, based on the second indication information, whether the slot type of each of the M slots is the uplink-only slot.

Figure 4:
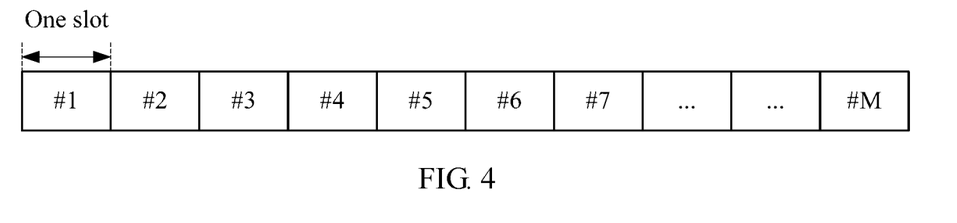
FIG. 4 is a schematic structural diagram of a slot according to an embodiment of this application.

In step 301, the M slots may be M consecutive slots that are dynamically changed. For example, as shown in FIG. 4, M slots are consecutive in time domain, and are all slots that can be dynamically changed. It should be noted that the "dynamically changed slot" described herein means that the network device can dynamically configure a slot type based on an actual situation.

Figure 5:
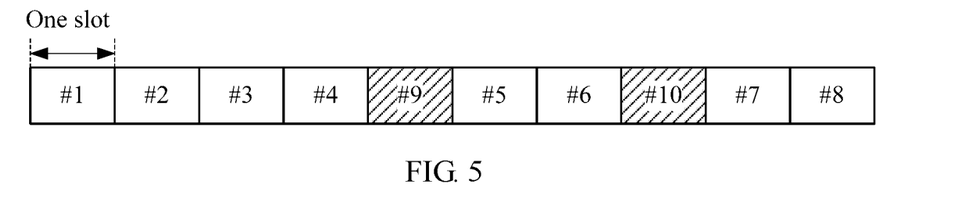
FIG. 5 is a schematic structural diagram of a slot according to an embodiment of this application.

Certainly, the M slots may alternatively be M inconsecutive slots that are dynamically changed. To be specific, at least one slot that is configured to be of a specified type is located between two slots in the M slots. For example, M is equal to 8. As shown in FIG. 5, a slot #1 to a slot #8 are dynamically changed slots after the third slot, a slot #9 and a slot #10 are slots configured to be of a specified type, the slot #9 is located between a slot #4 and a slot #5, and the slot #10 is located between a slot #6 and a slot #7. As a result, the slot #1 to the slot #8 are inconsecutive in time domain.

It should be noted that the M slots after the third slot do not include the third slot, and the third slot may be adjacent to a first slot in the M slots, or may be spaced by at least one slot from a first slot in the M slots. When the third slot and the first slot in the M slots are spaced by at least one slot, the network device and the terminal device may agree on a quantity of spaced slots in advance, or the network device may indicate a quantity of spaced slots to the terminal device by using higher layer signaling.

In this embodiment, the second indication information may include M bits, and each of the M bits uniquely indicates whether a type of one slot in the M slots is the uplink-only slot.

In some embodiments, for an $N^{th}$ bit in the M bits, if a value of the $N^{th}$ bit is a first preset value, a slot type corresponding to the $N^{th}$ bit is the uplink-only slot; or if a value of the $N^{th}$ bit is a second preset value, a slot type corresponding to the $N^{th}$ bit is not the uplink-only slot, where N is a positive integer greater than 0, and N is less than or equal to M.

For example, M is 4, the first preset value is 1, and the second preset value is 0.

When the second indication information is 1010, it indicates that a type of the first slot and a type of a third slot in the M slots are uplink-only slots, and a type of a second slot and a type of a fourth slot in the M slots are not the uplink-only slot.

Certainly, the foregoing is merely an example, and M may alternatively be another value. This is not limited herein. It should be noted that, in this embodiment of this application, the network device and the terminal device may agree on the value of M in advance, or the network device may send M to the terminal device by using higher layer signaling.

In this embodiment, the higher layer signaling may be a master information block (Master Information Block, MIB), a system information block (System Information Block, SIB), radio resource control (Radio Resource Control, RRC) signaling, or other higher layer signaling that has a similar characteristic.

In some embodiments, the second indication information may alternatively include Q bits, and there is a mapping relationship between a value of the Q bits and a location of the uplink-only slot in the M slots, where Q is greater than 0 and is less than or equal to M. For example, M is 4, and Q is 2. The mapping relationship between the value of the Q bits and the location of the uplink-only slot in the M slots may be shown in Table 2.

TABLE 2

| Value of Q bits | Location of an uplink-only slot in M slots |
|---|---|
| 00 | First slot |
| 01 | First slot and second slot |
| 10 | Second slot and third slot |
| 11 | Third slot and fourth slot |

When determining that the received second indication information is 00, the terminal device may determine that the first slot in the M slots after the third slot is the uplink-only slot. Another case may be deduced by analogy. Details are not described herein.

Certainly, the foregoing description is merely an example, and the second indication information may alternatively be in other forms, which are not illustrated herein one by one.

In step 302, when sending the second indication information by using the downlink control channel of the third slot, the network device may further send third indication information by using the downlink control channel. The third indication information indicates a slot type of the third slot.

In some embodiments, the slot type of the third slot may be any one of a UL-dominant slot, a DL-dominant slot, and a DL-only slot.

Further, in this embodiment of this application, the network device may further send fourth indication information. The fourth indication information indicates one or more of the following configurations in a target period:

a quantity of symbols occupied by an uplink control channel in one slot in all slots in the target period; and a quantity of symbols occupied by a downlink control channel in one slot in all the slots in the target period.

It should be noted that, in the target period, all the slots may not include the uplink control channel or the downlink control channel. When the fourth indication information indicates both the quantity of symbols occupied by the uplink control channel and the quantity of symbols occupied by the downlink control channel, the fourth indication information indicates a quantity of symbols occupied by each control channel in a slot that includes the uplink control channel and the downlink control channel, a quantity of symbols occupied by the uplink control channel in a slot that includes only the uplink control channel, or a quantity of symbols occupied by the downlink control channel in a slot that includes only the downlink control channel.

When the fourth indication information indicates only the quantity of symbols occupied by the uplink control channel, a quantity of symbols occupied by the downlink control channel in the slot that includes the uplink control channel and the downlink control channel may be a preset value. Correspondingly, when the fourth indication information indicates only the quantity of symbols occupied by the downlink control channel, a quantity of symbols occupied by the uplink control channel in the slot that includes the uplink control channel and the downlink control channel may be a preset value.

It should be noted that there may be a plurality of values for the quantity that is of symbols occupied by the uplink control channel in one slot and that is indicated by the fourth indication information, and correspondingly, there may be a plurality of values for the quantity that is of symbols occupied by the downlink control channel in one slot and that is indicated by the fourth indication information.

For example, the fourth indication information indicates that a quantity of symbols occupied by the uplink control channel and a quantity of symbols occupied by the downlink control channel in all the slots in the target period may be the following combinations.

The uplink control channel occupies one symbol, and the downlink control channel occupies one symbol;

the uplink control channel occupies one symbol, and the downlink control channel occupies two symbols;

the uplink control channel occupies two symbols, and the downlink control channel occupies one symbol; and the uplink control channel occupies two symbols, and the downlink control channel occupies two symbols.

The method is applicable to a scenario in which the quantity of symbols occupied by the uplink control channel is different in different slots in the target period, and/or a scenario in which the quantity of symbols occupied by the downlink control channel is different in different slots in the target period.

In this embodiment, the second indication information may be implemented in a plurality of manners. In a first possible implementation, the fourth indication information is broadcast system information, and in this implementation, the target period is a sending period of the broadcast system information.

In another implementation, the fourth indication information is common control information sent by using a common search space resource, and in this implementation, the target period is semi-statically configured or predefined by the network device.

In still another implementation, the fourth indication information is broadcast data information that is scheduled by broadcast scheduling signaling and that is sent by using a common search space resource, and in this implementation, the target period is semi-statically configured or predefined by the network device.

Certainly, the foregoing is merely an example, the fourth indication information may alternatively be implemented in another manner, and details are not described herein.

In step 304, after receiving the second indication information, the terminal device may determine, based on the second indication information, whether the slot type of each of the M slots is the uplink-only slot.

In some embodiments, for an $N^{th}$ slot in the M slots, if the terminal device determines that a type of the $N^{th}$ slot is the uplink-only slot, the terminal device may not listen to broadcast signaling on the $N^{th}$ slot to determine the type of the $N^{th}$ slot.

For the $N^{th}$ slot in the M slots, if the terminal device determines that the type of the $N^{th}$ slot is not the uplink-only slot, the terminal device may determine the slot type of the $N^{th}$ slot by using fifth indication information carried on a downlink control channel of the $N^{th}$ slot. The fifth indication information indicates the slot type of the $N^{th}$ slot. The slot type of the $N^{th}$ slot may be any one of the UL-dominant slot, the DL-dominant slot, and the DL-only slot. This is specifically determined based on an actual situation.

With reference to the foregoing description, the downlink control channel may further include the third indication information. In this case, the terminal device may further determine the slot type of the third slot based on the third indication information.

Further, the terminal device may receive the fourth indication information sent by the network device. For content indicated by the fourth indication information, refer to the description in step 302. Details are not described herein again.

In some embodiments, after receiving the fourth indication information sent by the network device, the terminal device may further determine, based on the third indication information and the fourth indication information, a quantity of symbols occupied by an uplink control channel in the third slot and a quantity of symbols occupied by the downlink control channel in the third slot.

For example, each slot includes a total of k symbols. A quantity of symbols occupied by downlink-uplink switching may be i, where i is predefined, or is dynamically indicated by physical layer signaling, or is semi-statically configured by using higher layer signaling. The fourth indication information indicates that the quantity of symbols occupied by the uplink control channel and the quantity of symbols occupied by the downlink control channel in all the slots in the target period are the following combinations.

The uplink control channel occupies one symbol, and the downlink control channel occupies one symbol;

the uplink control channel occupies one symbol, and the downlink control channel occupies two symbols;

the uplink control channel occupies two symbols, and the downlink control channel occupies one symbol; and the uplink control channel occupies two symbols, and the downlink control channel occupies two symbols.

In this case, when determining that the slot type of the third slot is the DL-only slot and the downlink control channel of the third slot occupies one symbol, the terminal device may determine that the downlink control channel occupies one symbol and that a downlink data channel occupies k−1 symbols.

When determining that the slot type of the third slot is the DL-only slot and the downlink control channel of the third slot occupies two symbols, the terminal device determines that the downlink control channel occupies two symbols and that a downlink data channel occupies k−2 symbols.

When determining that the slot type of the third slot is the UL-dominant slot, the uplink control channel of the third slot occupies one symbol, and the downlink control channel occupies one symbol, the terminal device determines that the uplink control channel of the third slot occupies one symbol, that the downlink control channel of the third slot occupies one symbol, that downlink-uplink switching occupies i symbols, and that an uplink data channel occupies k−2−i symbols.

When determining that the slot type of the third slot is the UL-dominant slot, the uplink control channel of the third slot occupies one symbol, and the downlink control channel occupies two symbols, the terminal device determines that the uplink control channel occupies one symbol, that the downlink control channel occupies two symbols, that downlink-uplink switching occupies i symbols, and that an uplink data channel occupies k−3−i symbols.

When determining that the slot type of the third slot is the UL-dominant slot, the uplink control channel of the third slot occupies two symbols, and the downlink control channel occupies one symbol, the terminal device determines that the uplink control channel occupies two symbols, that the downlink control channel occupies one symbol, that downlink-uplink switching occupies i symbols, and that an uplink data channel occupies k−3−i symbols.

When determining that the slot type of the third slot is the UL-dominant slot, the uplink control channel of the third slot occupies two symbols, and the downlink control channel occupies two symbols, the terminal device determines that the uplink control channel occupies two symbols, that the downlink control channel occupies one symbol, that downlink-uplink switching occupies i symbols, and that an uplink data channel occupies k−4−i symbols.

When determining that the slot type of the third slot is the DL-dominant slot, the uplink control channel of the third slot occupies one symbol, and the downlink control channel occupies one symbol, the terminal device determines that the uplink control channel occupies one symbol, that the downlink control channel occupies one symbol, that downlink-uplink switching occupies i symbols, and that a downlink data channel occupies k−2−i symbols.

When determining that the slot type of the third slot is the DL-dominant slot, the uplink control channel of the third slot occupies one symbol, and the downlink control channel occupies two symbols, the terminal device determines that the uplink control channel occupies one symbol, that the downlink control channel occupies two symbols, that downlink-uplink switching occupies i symbols, and that a downlink data channel occupies k−3−i symbols.

When determining that the slot type of the third slot is the DL-dominant slot, the uplink control channel of the third slot occupies two symbols, and the downlink control channel occupies one symbol, the terminal device determines that the uplink control channel occupies two symbols, that the downlink control channel occupies one symbol, that downlink-uplink switching occupies i symbols, and that a downlink data channel occupies k−3−i symbols.

When determining that the slot type of the third slot is the DL-dominant slot, the uplink control channel of the third slot occupies two symbols, and the downlink control channel occupies two symbols, the terminal device determines that the uplink control channel occupies two symbols, that the downlink control channel occupies two symbols, that downlink-uplink switching occupies i symbols, and that a downlink data channel occupies k−4−i symbols.

In some embodiments, after receiving the fourth indication information sent by the network device, the terminal device may further determine, based on the second indication information and the fourth indication information, a quantity of symbols occupied by an uplink control channel of an uplink-only slot in the target period.

When the UL-only slot includes k symbols and the uplink control channel occupies one symbol, the uplink control channel occupies one symbol, and an uplink data channel occupies k−1 symbols.

When the UL-only slot includes k symbols and the uplink control channel occupies two symbols, the uplink control channel occupies two symbols, and an uplink data channel occupies k−2 symbols.

Based on a same technical concept, an embodiment of this application further provides a slot type indication apparatus. The apparatus can execute the foregoing method embodiments.

Figure 6:
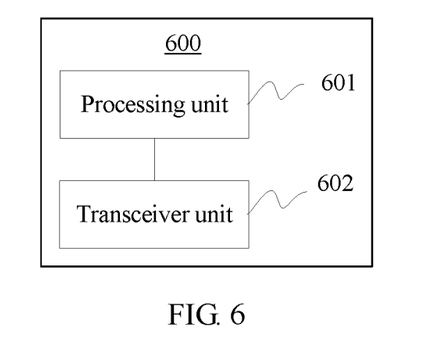
FIG. 6 is a schematic structural diagram of a slot type indication apparatus according to an embodiment of this application.

FIG. 6 is a schematic structural diagram of a slot type indication apparatus 600 according to an embodiment of this application. Optionally, the apparatus 600 may be a network device.

Referring to FIG. 6, the apparatus 600 includes:

a processing unit 601, configured to generate first indication information, where the first indication information indicates a slot type of a first slot, when the slot type of the first slot is a predefined type, the first indication information is further used to indicate whether a second slot is an uplink-only slot, and the first slot is a slot that includes a downlink control channel; and a transceiver unit 602, configured to send the first indication information by using the downlink control channel of the first slot.

In some embodiments, the second slot is a first slot whose type is dynamically configured after the first slot.

The second slot may be a slot adjacent to the first slot, or the second slot is a slot not adjacent to the first slot. For details, refer to the description in step 201. Details are not described herein again.

In some embodiments, the predefined type is an uplink-dominant slot or a downlink-dominant slot.

In some embodiments, the predefined type is semi-statically configured by using higher layer signaling.

The higher layer signaling may be a master information block, a system information block, radio resource control signaling, or other higher layer signaling that has a similar characteristic. For details, refer to the description in step 201. Details are not described herein again.

In some embodiments, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

For an implementation of the first indication information, refer to the description in step 201. Details are not described herein again.

In some embodiments, the first group of preset values and the second group of preset values multiplex a bit in the first indication information.

In some embodiments, a time-frequency resource that is on the downlink control channel and that is used to send the first indication information is predefined or semi-statically configured.

In some embodiments, a spacing between subcarriers that are on the downlink control channel and that are used to send the first indication information is predefined or semi-statically configured.

Figure 7:
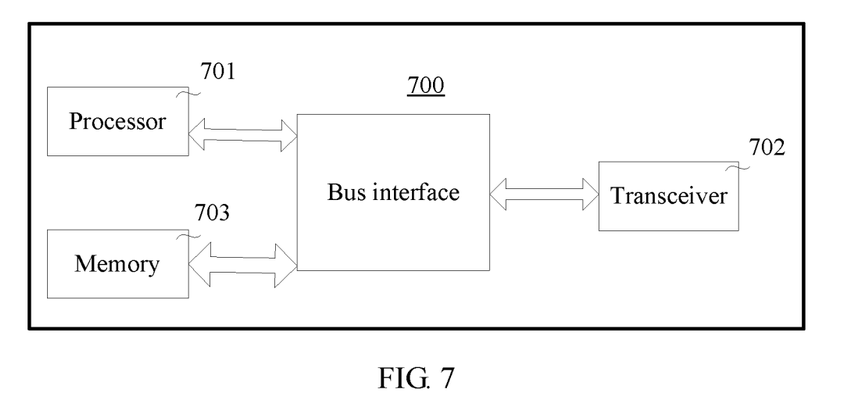
FIG. 7 is a schematic structural diagram of a network device according to an embodiment of this application.

It should be understood that division of the foregoing units is merely logical function division. In actual implementation, all or some of the units may be integrated into a physical entity, or may be physically separate. In this embodiment of this application, the transceiver unit 602 may be implemented by a transceiver, and the processing unit 601 may be implemented by a processor. As shown in FIG. 7, a network device 700 may include a processor 701, a transceiver 702, and a memory 703. The memory 703 may be configured to store a program/code that is preinstalled before the network device 700 is delivered from a factory, may store code executed by the processor 701, or the like.

Based on a same technical concept, an embodiment of this application further provides a slot type indication apparatus. The apparatus can execute the foregoing method embodiments.

Figure 8:
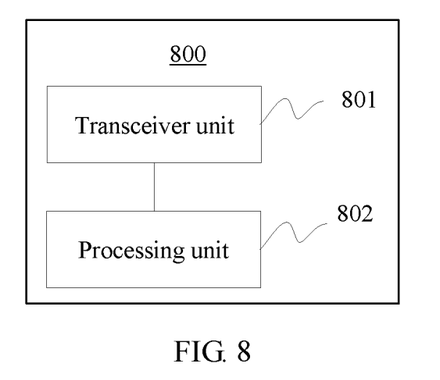
FIG. 8 is a schematic structural diagram of a slot type determining apparatus according to an embodiment of this application.

FIG. 8 is a schematic structural diagram of a slot type determining apparatus 800 according to an embodiment of this application. Optionally, the apparatus 800 may be a terminal device.

Referring to FIG. 8, the apparatus 800 includes:

a transceiver unit 801, configured to receive first indication information by using a downlink control channel of a first slot, where the first slot is a slot that includes the downlink control channel; and a processing unit 802, configured to determine a slot type of the first slot based on the first indication information, where when the slot type of the first slot is a predefined type, the first indication information is further used to indicate whether a second slot is an uplink-only slot.

In some embodiments, the second slot is a first slot whose type is dynamically configured after the first slot.

The second slot may be a slot adjacent to the first slot, or the second slot is a slot not adjacent to the first slot. For details, refer to the description in step 201. Details are not described herein again.

In some embodiments, the predefined type is an uplink-dominant slot or a downlink-dominant slot.

In some embodiments, the predefined type is semi-statically configured by using higher layer signaling.

In some embodiments, that the first indication information indicates the slot type of the first slot, and when the slot type of the first slot is the predefined type, the first indication information is further used to indicate whether the second slot is the uplink-only slot specifically includes:

the first indication information includes a first group of preset values and a second group of preset values, and when the first indication information is the first group of preset values, the slot type of the first slot is the predefined type, where a first preset value in the first group of preset values indicates that the second slot is the uplink-only slot, and a second preset value in the first group of preset values indicates that the second slot is not the uplink-only slot.

For an implementation of the first indication information, refer to the description in step 201. Details are not described herein again.

In some embodiments, the first group of preset values and the second group of preset values multiplex a bit in the first indication information.

In some embodiments, a time-frequency resource that is on the downlink control channel and that is used to send the first indication information is predefined or semi-statically configured.

In some embodiments, a spacing between subcarriers that are on the downlink control channel and that are used to send the first indication information is predefined or semi-statically configured.

Figure 9:
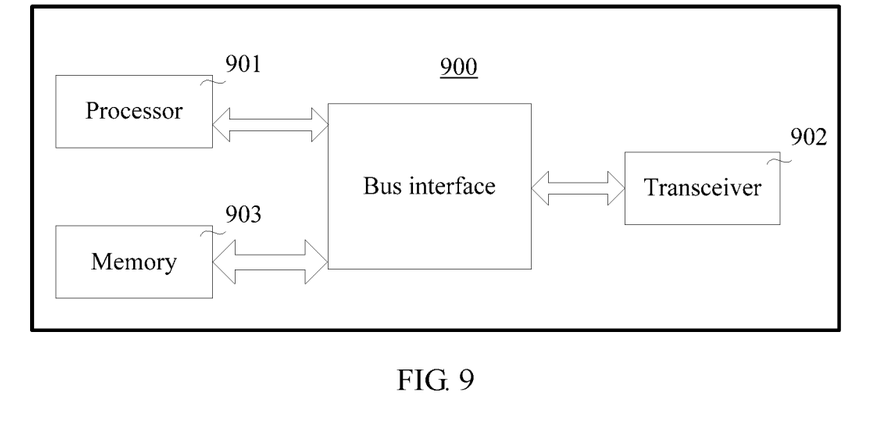
FIG. 9 is a schematic structural diagram of a terminal device according to an embodiment of this application.

It should be understood that division of the foregoing units is merely logical function division. In actual implementation, all or some of the units may be integrated into a physical entity, or may be physically separate. In this embodiment of this application, the transceiver unit 801 may be implemented by a transceiver, and the processing unit 802 may be implemented by a processor. As shown in FIG. 9, a terminal device 900 may include a processor 901, a transceiver 902, and a memory 903. The memory 903 may be configured to store a program/code that is preinstalled before the terminal device 900 is delivered from a factory, may store code executed by the processor 901, or the like.

In various embodiments, the transceiver may be a wired transceiver, a wireless transceiver, or a combination thereof. The wired transceiver may be, for example, an Ethernet interface. The Ethernet interface may be an optical interface, an electrical interface, or a combination thereof. For example, the wireless transceiver may be a wireless local area network transceiver, a cellular network transceiver, or a combination thereof. The processor may be a central processing unit (English: central processing unit, CPU for short), a network processor (English: network processor, NP for short), or a combination of a CPU and an NP. The processor may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field-programmable gate array, FPGA for short), a generic array logic (English: generic array logic, GAL for short), or any combination thereof. The memory may include a volatile memory (English: volatile memory) such as a random access memory (English: random access memory, RAM for short); or the memory may include a non-volatile memory (English: non-volatile memory) such as a read-only memory (English: read-only memory, ROM for short), a flash memory (English: flash memory), a hard disk drive (English: hard disk drive, HDD for short), or a solid-state drive (English: solid-state drive, SSD for short); or the memory may further include a combination of the foregoing types of memories.

FIG. 7 and FIG. 9 may further include a bus interface. The bus interface may include any quantity of interconnected buses and bridges. Specifically, one or more processors represented by the processor and various memory circuits represented by the memory are linked together. The bus interface may further link together various other circuits such as a peripheral device, a voltage regulator, and a power management circuit. This is known in the art, and therefore is not further described in this specification. The bus interface provides an interface.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

Obviously, a person skilled in the art can make various modifications and variations to this application without departing from the scope of this application. This application is intended to cover these modifications and variations provided that they fall within the scope of protection defined by the following claims.

What is claimed is:

1. A slot type indication method, comprising:
generating, by a network device, first indication information, wherein the first indication information indicates a slot type of a first slot, wherein when the slot type of the first slot is a predefined type, the first indication information indicates whether a second slot is an uplink-only slot, and the first slot is a slot that comprises a downlink control channel; and
sending, by the network device, the first indication information by using the downlink control channel of the first slot and, wherein
the first indication information comprises a first group of preset values and a second group of preset values, and when the first indication information is the first group of preset values, the slot type of the first slot is the predefined type, wherein a first preset value in the first group of preset values indicates that the second slot is the uplink-only slot, and a second preset value in the first group of preset values indicates that the second slot is not the uplink-only slot.

2. The method according to claim 1, wherein the second slot is a first slot whose type is dynamically configured after the first slot.

3. The method according to claim 1, wherein the predefined type is an uplink-dominant slot or a downlink-dominant slot.

4. The method according to claim 1, wherein the predefined type is semi-statically configured by using higher layer signaling.

5. The method according to claim 1, wherein the first group of preset values and the second group of preset values multiplex a bit in the first indication information.

6. The method according to claim 1, wherein a time-frequency resource that is on the downlink control channel and that is used to send the first indication information is predefined or semi-statically configured.

7. The method according to claim 1, wherein a spacing between subcarriers that are on the downlink control channel and that are used to send the first indication information is predefined or semi-statically configured.

8. A slot type determining method, comprising:
receiving, by a terminal device, first indication information by using a downlink control channel of a first slot; and
determining, by the terminal device, a slot type of the first slot based on the first indication information, wherein when the slot type of the first slot is a predefined type, the first indication information further indicates whether a second slot is an uplink-only slot; and, wherein
the first indication information comprises a first group of preset values and a second group of preset values, and when the first indication information is the first group of preset values, the slot type of the first slot is the predefined type, wherein a first preset value in the first group of preset values indicates that the second slot is the uplink-only slot, and a second preset value in the first group of preset values indicates that the second slot is not the uplink-only slot.

9. The method according to claim 8, wherein the second slot is a first slot whose type is dynamically configured after the first slot.

10. The method according to claim 8, wherein the predefined type is an uplink-dominant slot or a downlink-dominant slot.

11. The method according to claim 8, wherein the predefined type is semi-statically configured by using higher layer signaling.

12. The method according to claim 8, wherein the first group of preset values and the second group of preset values multiplex a bit in the first indication information.

13. The method according to claim 8, wherein a time-frequency resource that is on the downlink control channel and that is used to send the first indication information is predefined or semi-statically configured.

14. The method according to claim 8, wherein a spacing between subcarriers that are on the downlink control channel and that are used to send the first indication information is predefined or semi-statically configured.

15. A slot type indication apparatus, comprising:
- a processor configured to generate first indication information, wherein the first indication information indicates a slot type of a first slot, when the slot type of the first slot is a predefined type, the first indication information further indicates whether a second slot is an uplink-only slot, and the first slot is a slot that comprises a downlink control channel; and
- a transceiver configured to send the first indication information by using the downlink control channel of the first slot; and, wherein the first indication information comprises a first group of preset values and a second group of preset values, and when the first indication information is the first group of preset values, the slot type of the first slot is the predefined type, wherein a first preset value in the first group of preset values indicates that the second slot is the uplink-only slot, and a second preset value in the first group of preset values indicates that the second slot is not the uplink-only slot.

16. The apparatus according to claim 15, wherein the second slot is a first slot whose type is dynamically configured after the first slot.

17. The apparatus according to claim 15, wherein the predefined type is an uplink-dominant slot or a downlink-dominant slot.

18. The apparatus according to claim 15, wherein the predefined type is semi-statically configured by using higher layer signaling.

* * * * *